United States Patent
Meng et al.

(10) Patent No.: US 12,125,606 B2
(45) Date of Patent: Oct. 22, 2024

(54) METHOD AND COMPOSITIONS TO ACHIEVE LONG-TERM STABLE ELECTRICAL CONDUCTIVITY IN SILICONE MATERIAL WITH CARBON BLACK AS CONDUCTIVE FILLERS

(71) Applicant: Elkem Silicones USA Corp., East Brunswick, NJ (US)

(72) Inventors: Yan Meng, Rock Hill, SC (US); Amanda Burton, Gastonia, NC (US); Danaya Pratchayanan, Charlotte, NC (US)

(73) Assignee: Elkem Silicones USA Corp., East Brunswick, NJ (US)

( * ) Notice: Subject to any disclaimer, the term of this patent is extended or adjusted under 35 U.S.C. 154(b) by 325 days.

(21) Appl. No.: 17/337,123

(22) Filed: Jun. 2, 2021

(65) Prior Publication Data
US 2021/0383942 A1 Dec. 9, 2021

Related U.S. Application Data

(60) Provisional application No. 63/034,226, filed on Jun. 3, 2020.

(51) Int. Cl.
| | | |
|---|---|---|
| *H01B 1/04* | (2006.01) | |
| *B01J 31/12* | (2006.01) | |
| *B33Y 70/00* | (2020.01) | |
| *C08K 3/04* | (2006.01) | |
| *C08L 83/04* | (2006.01) | |
| *B33Y 10/00* | (2015.01) | |
| *B33Y 80/00* | (2015.01) | |

(52) U.S. Cl.
CPC ............. *H01B 1/04* (2013.01); *B01J 31/122* (2013.01); *B33Y 70/00* (2014.12); *C08K 3/04* (2013.01); *C08L 83/04* (2013.01); *B33Y 10/00* (2014.12); *B33Y 80/00* (2014.12); *C08L 2201/00* (2013.01)

(58) Field of Classification Search
CPC ............ H01B 1/04; C08L 83/04; B33Y 70/00
See application file for complete search history.

(56) References Cited

U.S. PATENT DOCUMENTS

| | | | |
|---|---|---|---|
| 5,164,443 A | 11/1992 | Watanabe | |
| 5,346,940 A | 9/1994 | Brassard et al. | |
| 6,348,557 B1 * | 2/2002 | Barthel | C08K 5/54 |
| | | | 524/731 |
| 10,513,609 B2 | 12/2019 | Cree | |
| 2009/0088524 A1 * | 4/2009 | Koellnberger | C07C 2/38 |
| | | | 524/588 |
| 2013/0012645 A1 | 1/2013 | Lucas | |
| 2015/0123044 A1 | 5/2015 | Yoshida | |
| 2018/0215985 A1 | 8/2018 | Yoshida et al. | |

FOREIGN PATENT DOCUMENTS

| | | | | |
|---|---|---|---|---|
| CN | 105713394 A | 6/2016 | | |
| JP | S63117064 A | 5/1988 | | |
| JP | H06306289 A | 11/1994 | | |
| JP | 2005132969 A | 5/2005 | | |
| JP | 2007186544 A | 7/2007 | | |
| WO | WO 2011057925 A1 * | 5/2011 | | C08L 23/06 |
| WO | 2013006189 A1 | 1/2013 | | |

OTHER PUBLICATIONS

International Search Report for Application No. PCT/US2021/035495 mailed Sep. 16, 2021.
Written Opinion of the International Searching Authority for Application No. PCT/US2021/035495 mailed Sep. 16, 2021.
B. B. Boonstra, "Role of Particulate Fillers in Elastomer Reinforcement: a Review," Polymer, (1979), vol. 20, No. 6 : 691-704.
Database WPI, Week 198826, Thomson Scientific, London, GB; AN 1988-179492, XP002804122.
International Preliminary Report on Patentabilility of International Application No. PCT/US2021/035495, mailed Dec. 6, 2022.
Huang, P. et al., "3D printing of carbon fiber-filled conductive silicon rubber", Materials & Design, 142, pp. 11-21, https://doi.org/10.1016/j.matdes.2017.12.051, Dec. 29, 2017 (Dec. 29, 2017) Dec. 29, 2017.
"Functional Macromolecular Materials", 2nd edition, Jun. 30, 2014, Wang Guojian, et al., Tongji University Press, pp. 143-145 (Book extract in CN) Jun. 30, 2014.
"Polymer" vol. 20, No. 6, Jun. 30, 1979, B.B. Boonstra et al., Role of particulate fillers in elastomer reinforcement: a review, pp. 691-704 Jun. 30, 1979.

* cited by examiner

*Primary Examiner* — Khanh T Nguyen
(74) *Attorney, Agent, or Firm* — McBee Moore & Vanik, IP, LLC

(57) ABSTRACT

Electrically conductive or semi-conductive curable silicone compositions with stable long term electrical resistivity/resistance are provided comprising a mixture of furnace black and acetylene black as conductive fillers. Methods for preparing the electrically conductive or semi-conductive curable silicone compositions and uses of the electrically conductive or semi-conductive curable silicone compositions are also provided.

22 Claims, No Drawings

METHOD AND COMPOSITIONS TO ACHIEVE LONG-TERM STABLE ELECTRICAL CONDUCTIVITY IN SILICONE MATERIAL WITH CARBON BLACK AS CONDUCTIVE FILLERS

CROSS-REFERENCE TO RELATED APPLICATIONS

This application claims the benefit of U.S. Provisional Application No. 63/034,226, filed on Jun. 3, 2020, the contents of which are hereby incorporated by reference in its entirety.

FIELD OF THE INVENTION

The present invention relates to electrically conductive or semi-conductive curable silicone compositions with stable long term electrical resistivity/resistance comprising a mixture of furnace black and acetylene black as conductive fillers.

BACKGROUND OF THE INVENTION

Silicone compositions which cure to give silicone rubbers are well known, and such compositions are widely used as potting materials and coating materials for electric and electronic parts and as shaping materials for molds because of their excellent properties, such as high weather-resistance, heat-resistance, cold resistance and electric insulating property. Additionally, techniques for imparting electrically conductive properties to a silicone composition which is naturally an insulating material are also known in the art. Imparting electrically conductive properties to a silicone composition by incorporating an electrically conductive filler into the silicone composition is generally known. The most common electrically conductive fillers are carbon black, silver particles, silvered nickel, silvered aluminum, silvered glass particles, nickel, etc. Carbon black is the most common electrically conductive filler due to its low cost and reinforcing capability in rubber. To increase electrical conductivity, carbon black of higher electrical conductivity or more carbon black are added to polymer.

There are 5 types of carbon black in the industry: furnace black, thermal black, lampblack, channel black, and acetylene black. They are each manufactured by different processes. The most widely used carbon blacks in the rubber and plastics industries are furnace black and thermal black. More than 90% of the carbon blacks currently produced in the world are made by the furnace process, i.e., furnace black, in which petroleum oil is thermally decomposed to form carbon black particles.

Each type of carbon black differ in physical and chemical properties. The DBP oil absorption shows the degree of structure that is complex aggregation due to chemical and physical bonding between the carbon black particles, and is given by the number of ml of oil contained per 100 g of carbon black. Usually the higher the degree of structure, or oil absorption number (OAN), the higher the electrical conductivity. An iodine adsorption number (I2NO or IAN) is an index which is the most common technique to measure the surface area of carbon blacks, and is given by the number of grams of iodine adsorbed per kilogram of carbon black or by the number of milligrams of iodine adsorbed per gram of carbon black. From the perspective of achieving better conductivity, it is preferred to have a high iodine absorption number. However, high iodine absorption number may be a problem for processing. Similar with iodine adsorption number, higher BET surface area is beneficial to achieve higher conductivity. However, it also increases the difficulty of processing.

For electrically conductive or semi-conductive silicone materials that use only furnace black as the conductive filler, which is the carbon black type that is more than 90% of all the carbon blacks currently produced in the world, it is found that the electrical resistivity/resistance increases significantly over time after the silicone material is cured.

U.S. Pat. No. 5,164,443 discloses that incorporation of magnesium carbonate into the composition is effective to improve the reproducibility and stability of the electroconductivity of the carbon black-containing electroconductive silicone composition. "Magnesium carbonate" means a basic magnesium carbonate, which may roughly be represented by $4MgCO_3 \cdot Mg(OH)_2 \cdot 5H_2O$. The amount of magnesium carbonate to be added in the composition is preferably from 10 to 300 parts by weight per 100 parts by weight of carbon black in the composition. However, addition of such a filler lowers the relative content of the electroconductive carbon black in the composition and thereby may cause the electroconductivity of the resulting composition to be lower. In addition, for acetoxy moisture cure silicone compositions, there is the concern that magnesium carbonate reacts with acetic acid in the composition and reduces shelf-life.

JP2007186544A claimed to achieve good conductivity (not stable conductivity or long term stability of conductivity) by using CB produced by MMM process or a blend of MMM CB with other type of CB. MMM process is an oil combustion method to produce CB that does not include a water quenching step.

There remains a need to alleviate the problem of significant electrical resistivity/resistance increasing over time after the silicone material is cured.

BRIEF SUMMARY OF THE INVENTION

As a result of diligent research, the inventors of the present invention found that it was possible to solve the above-mentioned problems by combining two types or more of carbon blacks at a desired weight ratio range, such as furnace black with acetylene black, to provide an electrically conductive or semi-conductive silicone material with stable long term electrical resistivity/resistance.

A curable silicone composition X is provided, wherein the curable silicone composition X comprises:

(A) a silicone base comprising at least one organosilicon component A which cures via condensation-curing reaction;

(B) a combination of at least two types of carbon black CB, in which at least one carbon black is a furnace black CB1 and at least one carbon black is an acetylene black CB2; and (C) a condensation catalyst C;

(D) at least one crosslinking agent D; and (E) optionally, an adhesion promoter E.

In some embodiments, the at least one organosilicon component A is a hydroxyl-endcapped polydiorganosiloxane. In some embodiments, the at least one organosilicon component A is a blend of hydroxyl-endcapped polydiorganosiloxanes, such as, for example, a blend of at least three polydiorganosiloxanes having a hydroxyl group at both ends (A1, A2, and A3), wherein the hydroxyl-endcapped polydiorganosiloxane A1 has a viscosity between about 100 to about 10,000 mPa·s at 25° C.; the hydroxyl-endcapped polydiorganosiloxane A2 has a viscosity between about 5,000 to about 25,000 mPa·s at 25° C.; and the hydroxyl-endcapped polydiorganosiloxane A3 has a viscosity between about 20,000 to about 100,000 mPa·s at 25° C.

All the viscosities under consideration in the present specification correspond to a dynamic viscosity magnitude that is measured, in a manner known per se, at 25° C., with a machine of Brookfield type. As regards to fluid products, the viscosity under consideration in the present specification is the dynamic viscosity at 25° C., known as the "Newtonian" viscosity, i.e. the dynamic viscosity that is measured, in a manner known per se, at a sufficiently low shear rate gradient so that the viscosity measured is independent of the rate gradient.

In some embodiments, the furnace black CB1 has one or more of the following properties: a BET surface area of from 80 to 300 $m^2/g$, an oil absorption number of from 70 to 250 ml/100 g, and an iodine absorption number of from 100 to 350 mg/g.

In some embodiments, the acetylene black CB2 has one or more of the following properties: a BET surface area of from 50 to 200 $m^2/g$, an oil absorption number of from 70 to 250 ml/100 g, and an iodine absorption number of from 70 to 150 mg/g.

In some embodiments, the total amount of carbon black CB in the curable silicone composition X of the invention is from 5 to 50% by weight based on the total composition, preferably from 10 to 25% by weight based on the total composition.

In some embodiments, the weight ratio of the furnace black CB1 to the acetylene black CB2 in the curable silicone composition X of the invention is from 93:7 to 7:93, preferably from 93:7 to 50:50.

In some embodiments, the condensation catalyst C used in the curable silicone composition X of the invention is a tin derivative selected from the group consisting of dimethyl tin dioleate, dimethyl tin dilaurate, dibutyl tin diacetate, dibutyl tin dioctoate, dibutyl tin dilaurate (DBTDL), dibutyl tin dioleate, diphenyl tin diacetate, dibutyl tin oxide, dibutyl tin dimethoxide, dibutyl-bis(triethoxysiloxy) tin, and dioctyl tin dilaurate.

In some embodiments, the at least one crosslinking agent D is one or more compound selected from methyltriacetoxysilane, ethyltriacetoxysilane, vinyltriacetoxysilane, methyltris(acetonoxime)silane, vinyltris(acetonoxime)silane, methyltris(methylethylketoxime)silane, vinyltris(methylethylketoxime)silane; and partial hydrolysates of the said compounds. Preferably, the at least one crosslinking agent D is methyltriacetoxysilane, ethyltriacetoxysilane, or a combination thereof.

In some embodiments, the adhesion promoter E is selected from di-t-butoxydiacetoxysilane, gamma-glycidoxypropyltrimethoxysilane (glymo), or a combination thereof.

In some embodiments, the curable silicone composition X is a single-component RTV-1 silicone composition.

A cured silicone rubber obtained by curing a curable silicone composition X according to the invention is also provided. An article comprising the curable silicone composition X according to the invention is further provided.

Use of the curable silicone composition X as an electrically conductive silicone sealant is further provided. In some embodiments, the electrically conductive silicone sealant is used to coat the surface of stator bars of hydro-generators.

Uses of a curable silicone composition X of the invention with a 3D printer are also provided.

DETAILED DESCRIPTION OF THE INVENTION

Before the subject disclosure is further described, it is to be understood that the disclosure is not limited to the particular embodiments of the disclosure described below, as variations of the particular embodiments may be made and still fall within the scope of the appended claims. It is also to be understood that the terminology employed is for the purpose of describing particular embodiments, and is not intended to be limiting. Instead, the scope of the present disclosure will be established by the appended claims.

In this specification and the appended claims, the singular forms "a," "an," and "the" include plural reference unless the context clearly dictates otherwise. Unless defined otherwise, all technical and scientific terms used herein have the same meaning as commonly understood to one of ordinary skill in the art to which this disclosure belongs.

As used herein, the term "silicone rubber" includes the crosslinked product of any crosslinkable silicone composition. The terms "silicone rubber" and "silicone elastomer" may be used interchangeably.

As used herein, the terms "crosslinked" and "cured" may be used interchangeably and refer to the reaction that occurs when the components of the curable silicone composition are combined and allowed to react, resulting in the cured silicone elastomer.

In one aspect, the present invention is a curable silicone composition X, wherein said curable silicone composition X comprises:
  (A) a silicone base comprising at least one organosilicon component A which cures via condensation-curing reaction;
  (B) a combination of at least two types of carbon black CB, in which at least one carbon black is a furnace black and at least one carbon black is an acetylene black; and
  (C) a condensation catalyst C;
  (D) at least one crosslinking agent D; and
  (E) optionally, an adhesion promoter E.

The inventors have surprisingly found that use of curable silicone compositions X as defined herein provides stable electroconductivity and excellent rheological properties. In particular, use of the curable silicone compositions X of the invention as an electrically conductive sealant provide good adhesion, fast cure, and optimal viscosity without compromising electrical conductivity.

In particular, it has been found that use of a combination of furnace black and acetylene black in silicone compositions results in stable electroconductivity.

The surface areas described herein are determined by means of nitrogen absorption according to the ASTM Special Technical Bulletin No. 51, 1941, pages 95 and ff. (Generally described as the "BET" Method).

The term "furnace black' is also described in the German chemical literature (cf. "Ullmanns Encyklopadie der technischen Chemie", Volume 14, Munich-Berlin, 1963, page 799). Any suitable furnace black can be used in the curable silicone compositions X of the invention. Preferably, the furnace black is a furnace black that imparts excellent electroconductivity. Examples include conducting furnace black (CF), super conducting furnace black (SCF), extra conducting furnace black (XCF), and furnace black treated at elevated temperatures of about 1500° C. More particularly, the conducting furnace black includes Continex CF manufactured by Continental Carbon Co., and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp. Also useful are modified furnace blacks commercially available as Ketjen Black EC and Ketjen Black EC-600JD from Ketjen Black International.

In some embodiments, the furnace black used in the curable silicone compositions X of the invention has a BET surface area of from 40 to 1500 $m^2/g$, preferably from 80 to 300 $m^2/g$. In other embodiments, the furnace black used in the curable silicone compositions X of the invention has a BET surface area of from 100 to 300 $m^2/g$, from 125 to 300 $m^2/g$, from 150 to 300 $m^2/g$, from 175 to 300 $m^2/g$, from 200 to 300 $m^2/g$, or from 225 to 300 $m^2/g$. Alternatively, the furnace black used in the curable silicone compositions X of the invention has a BET surface area of from 100 to 275 $m^2/g$, from 125 to 275 $m^2/g$, from 150 to 275 $m^2/g$, from 175 to 275 $m^2/g$, from 200 to 275 $m^2/g$, or from 225 to 275 $m^2/g$. Alternatively, the furnace black used in the curable silicone compositions X of the invention has a BET surface area of from 100 to 250 $m^2/g$, from 125 to 250 $m^2/g$, from 150 to 250 $m^2/g$, from 175 to 250 $m^2/g$, from 200 to 250 $m^2/g$, or from 225 to 250 $m^2/g$.

In some embodiments, the furnace black used in the curable silicone compositions X of the invention has an oil absorption number of from 30 to 1200 ml/100 g, preferably from 70 to 250 ml/100 g. In other embodiments, the furnace black used in the curable silicone compositions X of the invention has an oil absorption number of from 100 to 250 ml/100 g, from 125 to 250 ml/100 g, from 150 to 250 ml/100 g, or from 175 to 250 ml/100 g. Alternatively, the furnace black used in the curable silicone compositions X of the invention has an oil absorption number of from 70 to 230 ml/100 g, from 100 to 230 ml/100 g, from 125 to 230 ml/100 g, from 150 to 230 ml/100 g, or 175 to 230 ml/100 g.

In some embodiments, the furnace black used in the curable silicone compositions X of the invention has an iodine absorption number of from 6 to 400 mg/g, preferably from 100 to 350 mg/g. In other embodiments, the furnace black used in the curable silicone compositions X of the invention has an iodine absorption number of from 125 to 350 mg/g, from 150 to 350 mg/g, from 175 to 350 mg/g, from 200 to 350 mg/g, from 225 to 350 mg/g, or from 250 to 350 mg/g. Alternatively, the furnace black used in the curable silicone compositions X of the invention has an iodine absorption number of from 100 to 325 mg/g, from 125 to 325 mg/g, from 150 to 325 mg/g, from 175 to 325 mg/g, from 200 to 325 mg/g, from 225 to 325 mg/g, or from 250 to 325 mg/g. Alternatively, the furnace black used in the curable silicone compositions X of the invention has an iodine absorption number of from 100 to 300 mg/g, from 125 to 300 mg/g, from 150 to 300 mg/g, from 175 to 300 mg/g, from 200 to 300 mg/g, from 225 to 300 mg/g, or from 250 to 300 mg/g. Alternatively, the furnace black used in the curable silicone compositions X of the invention has an iodine absorption number of from 100 to 275 mg/g, from 125 to 275 mg/g, from 150 to 275 mg/g, from 175 to 275 mg/g, from 200 to 275 mg/g, from 225 to 275 mg/g, or from 250 to 275 mg/g.

Any suitable acetylene black can be used in the curable silicone compositions X of the invention. Preferably, the acetylene black is an acetylene black that imparts excellent electroconductivity. Examples include Denka Acetylene Black manufactured by Denka Kagaku K.K., Shawinigan Acetylene Black manufactured by Shawinigan Chemical Co.; and Acetylene Black-01 manufactured by Soltex.

In some embodiments, the acetylene black used in the curable silicone compositions X of the invention has a BET surface area of from 40 to 1000 $m^2/g$, preferably from 50 to 200 $m^2/g$. In other embodiments, the acetylene black used in the curable silicone compositions X of the invention has a BET surface area of from 50 to 175 $m^2/g$, from 50 to 150 $m^2/g$, from 50 to 125 $m^2/g$, from 50 to 100 $m^2/g$, from 50 to 90 $m^2/g$, from 50 to 80 $m^2/g$, or from 50 to 75 $m^2/g$. Alternatively, the acetylene black used in the curable silicone compositions X of the invention has a BET surface area of from 60 to 200 $m^2/g$, from 60 to 175 $m^2/g$, from 60 to 150 $m^2/g$, from 60 to 125 $m^2/g$, from 60 to 100 $m^2/g$, from 60 to 90 $m^2/g$, from 60 to 80 $m^2/g$, or from 60 to 75 $m^2/g$.

In some embodiments, the acetylene black used in the curable silicone compositions X of the invention has an oil absorption number of from 30 to 1200 ml/100 g, preferably from 70 to 250 ml/100 g. In other embodiments, the acetylene black used in the curable silicone compositions X of the invention has an oil absorption number of from 100 to 250 ml/100 g, from 125 to 250 ml/100 g, from 150 to 250 ml/100 g, or from 175 to 250 ml/100 g. Alternatively, the acetylene black used in the curable silicone compositions X of the invention has an oil absorption number of from 70 to 230 ml/100 g, from 100 to 230 ml/100 g, from 125 to 230 ml/100 g, from 150 to 230 ml/100 g, or from 175 to 230 ml/100 g.

In some embodiments, the acetylene black used in the curable silicone compositions X of the invention has an iodine absorption number of from 6 to 400 mg/g, preferably from 70 to 150 mg/g. In other embodiments, the acetylene black used in the curable silicone compositions X of the invention has an iodine absorption number of from 70 to 125 mg/g or from 70 to 100 mg/g. Alternatively, the acetylene black used in the curable silicone compositions X of the invention has an iodine absorption number of from 75 to 150 mg/g, from 75 to 125 mg/g, or from 75 to 100 mg/g. Alternatively, the acetylene black used in the curable silicone compositions X of the invention has an iodine absorption number of from 80 to 150 mg/g, from 80 to 125 mg/g, or from 80 to 100 mg/g. Alternatively, the acetylene black used in the curable silicone compositions X of the invention has an iodine absorption number of from 85 to 150 mg/g, from 85 to 125 mg/g, or from 85 to 100 mg/g.

The total amount of carbon black in the curable silicone composition X is from 5 to 50% by weight based on the total composition, preferably from 10 to 25% by weight based on the total composition. In some embodiments, the total amount of carbon black in the curable silicone composition X is from 10 to 20% by weight, from 10 to 19% by weight, from 10 to 18% by weight, from 10 to 17% by weight, from 10 to 16% by weight, or from 10 to 15% by weight, all based on the total composition. In other embodiments, the total amount of carbon black in the curable silicone composition X is from 11 to 20% by weight, from 11 to 19% by weight, from 11 to 18% by weight, from 11 to 17% by weight, from 11 to 16% by weight, or from 11 to 15% by weight, all based on the total composition. Alternatively, the total amount of carbon black in the curable silicone composition X is from 12 to 20% by weight, from 12 to 19% by weight, from 12 to 18% by weight, from 12 to 17% by weight, from 12 to 16% by weight, or from 12 to 15% by weight, all based on the total composition. Alternatively, the total amount of carbon black in the curable silicone composition X is from 13 to 20% by weight, from 13 to 19% by weight, from 13 to 18% by weight, from 13 to 17% by weight, from 13 to 16% by weight, or from 13 to 15% by weight, all based on the total composition. Alternatively, the total amount of carbon black in the curable silicone composition X is from 14 to 20% by weight, from 14 to 19% by weight, from 14 to 18% by weight, from 14 to 17% by weight, from 14 to 16% by weight, or from 14 to 15% by weight, all based on the total composition.

In some embodiments, the weight ratio of furnace black to acetylene black is from 97:3 to 3:97, preferably from 92:8 to 8:92. In some embodiments, the weight ratio of furnace black to acetylene black is from 97:3 to 33:67, from 97:3 to 50:50, from 97:3 to 60:40, from 97:3 to 70:30, from 97:3 to 75:25, from 97:3 to 80:20, from 97:3 to 84:16, from 97:3 to 85:15, from 97:3 to 86:14, from 97:3 to 87:13, from 97:3 to 88:12, from 97:3 to 89:11, from 97:3 to 90:10, from 97:3 to 91:9, or from 97:3 to 92:8. In other embodiments, the weight ratio of furnace black to acetylene black is from 95:5 to 33:67, from 95:5 to 50:50, from 95:5 to 60:40, from 95:5 to 70:30, from 95:5 to 75:25, from 95:5 to 80:20, from 95:5 to 84:16, from 95:5 to 85:15, from 95:5 to 86:14, from 95:5 to 87:13, from 95:5 to 88:12, from 95:5 to 89:11, from 95:5 to 90:10, from 95:5 to 91:9, or from 95:5 to 92:8. Alternatively, the weight ratio of furnace black to acetylene black is from 94:6 to 33:67, from 94:6 to 50:50, from 94:6 to 60:40, from 94:6 to 70:30, from 94:6 to 75:25, from 94:6 to 80:20, from 94:6 to 84:16, from 94:6 to 85:15, from 94:6 to 86:14, from 94:6 to 87:13, from 94:6 to 88:12, from 94:6 to 89:11, from 94:6 to 90:10, from 94:6 to 91:9, or from 94:6 to 92:8. Alternatively, the weight ratio of furnace black to acetylene black is from 93:7 to 33:67, from 93:7 to 50:50, from 93:7 to 60:40, from 93:7 to 70:30, from 93:7 to 75:25, from 93:7 to 80:20, from 93:7 to 84:16, from 93:7 to 85:15, from 93:7 to 86:14, from 93:7 to 87:13, from 93:7 to 88:12, from 93:7 to 89:11, from 93:7 to 90:10, from 93:7 to 91:9, or from 93:7 to 92:8. Alternatively, the weight ratio of furnace black to acetylene black is from 92:8 to 33:67, from 92:8 to 50:50, from 92:8 to 60:40, from 92:8 to 70:30, from 92:8 to 75:25, from 92:8 to 80:20, from 92:8 to 84:16, from 92:8 to 85:15, from 92:8 to 86:14, from 92:8 to 87:13, from 92:8 to 88:12, from 92:8 to 89:11, from 92:8 to 90:10, or from 92:8 to 91:9.

In some embodiments, one or more further carbon blacks can be added to the curable silicone compositions X of the invention in addition to the furnace black and the acetylene black mentioned above. The one or more further carbon black can be any suitable carbon black(s). For example, the one or more further carbon blacks can be any carbon black mentioned above or any combination thereof. In some embodiments, the one or more further carbon black may be any conventional carbon black which is traditionally used in the production of conductive rubber compositions. Examples include thermal black, lamp black, acetylene black, conducting furnace black (CF), super conducting furnace black (SCF), extra conducting furnace black (XCF), conducting channel black (CC), and furnace black and channel black heat treated at elevated temperatures of about 1500° C. More particularly, the acetylene black includes Denka Acetylene Black manufactured by Denki Kagaku K.K., Shawinigan Acetylene Black manufactured by Shawinigan Chemical Co., and Acetylene Black-01 manufactured by Soltex, the conducting furnace black includes Continex CF manufactured by Continental Carbon Co., and Vulcan C manufactured by Cabot Corp., the super conducting furnace black includes Continex SCF manufactured by Continental Carbon Co. and Vulcan SC manufactured by Cabot Corp., the extra conducting furnace black includes Asahi HS-500 manufactured by Asahi Carbon K.K. and Vulcan XC-72 manufactured by Cabot Corp., and the conducting channel black includes Corax L. manufactured by Degussa Co. Also useful are modified furnace blacks commercially available as Ketjen Black EC and Ketjen Black EC-600JD from Ketjen Black International. Preferred among others is acetylene black because it is more conductive due to a reduced impurity content and a well-developed secondary structure. Also, Ketjen Black EC and Ketjen Black EC-600JD are useful because they have an extremely increased specific surface area so that sufficient conductivity is accomplished with a low loading.

Curable silicone compositions are well known in the art and include silicone compositions which cure through 3 types of reactions: peroxide-curing, addition-curing, or condensation-curing.

Curable silicone compositions are classified according to curing methods used, curing temperature conditions and consistency or viscosity of the curable silicone compositions as listed below:

HCR (High Consistency Silicone Rubbers) are heat-curable silicone compositions (or HTV which is an acronym for High Temperature Vulcanizing silicone compositions) for which their components cure via addition-curing or peroxide-curing reaction. They are prepared from reactive silicone gums with high molecular weight macromolecules containing various reactive groups.

LSR (Liquid Silicone Rubbers) are heat-curable silicone compositions (or High Temperature Vulcanizing, HTV) which use addition-curing catalysts and are sold as two-component systems. The primary differentiator between liquid silicone rubber (LSR) and high consistency rubber (HCR) is the "flowable" or "liquid" nature of LSR materials.

RTV (Room Temperature Vulcanizing) are curable silicone compositions which use either addition-curing catalysts or condensation-curing catalysts. They are sold as single or 2-component systems that cure from room temperature for those using condensation-curing catalyst to up to 200° C. for those using addition-curing catalysts.

Curable compositions which cure via condensation-curing reaction refers to a curable silicone composition where curing is achieved through the reaction between a silanol group (Si—OH) of a siloxane polymer or a silane and/or hydrolysable Si—X groups (X is a hydrolyzable group) in the presence of moisture, leading to the formation of siloxane (Si—O—Si) linkages and hydrogen gas or water. Typically, condensation-cure silicone systems have been cured with organotin compounds and/or titanates. Other catalysts are sometimes mentioned, such as catalysts based on zinc, zirconium, aluminum or amines such as guanidine derivatives. Classically, these formulations contain a hydroxyl-terminated silicone oil, for example an α,ω-(hydroxydimethylsilyl)-polydimethylsiloxane, optionally pre-functionalized with a silane so that it has hydrolyzable and condensable ends, a crosslinking agent, a polycondensation catalyst, classically a tin salt or an alkyl titanate, and optionally various fillers and additives depending on the intended final application.

These silicone compositions that harden by polymerization and/or crosslinking at ambient temperature (which can vary between 5° and 30° C. depending on the region) are familiar to a person skilled in the art and are classified in two separate groups:

compositions packaged as a "single-component" composition (RTV-1), which are in the form of a single part (or component) in airtight packaging, and compositions packaged as a "two-component" composition (RTV-2), which are in the form of two separate parts (hence the designation "two-component") and whose packaging containing the catalyst is airtight.

The purpose of the airtight packaging is to prevent the silicone compositions containing the catalyst from coming into contact with atmospheric moisture during storage before use. During curing, which takes place by polymerization and/or crosslinking of these silicone compositions, water is supplied by atmospheric moisture in the case of the RTV-1 compositions. In the case of the RTV-2 compositions, dimethyltin dicarboxylates are commonly used as catalysts, but they may require the addition of some water to one of the parts in order to activate the catalyst and enable the polycondensation reaction when the contents of the two parts are mixed with ambient air so as to form the elastomer network, which leads to curing of the composition.

For example, the single-component silicone compositions (RTV-1) used as mastics or adhesives undergo cold crosslinking by a mechanism involving two main reactions, which may be successive or simultaneous:
1. A functionalization reaction, resulting from bringing a silicone oil having silanol functions, for example a hydroxyl-terminated silicone oil, such as an α,ω-(hydroxydimethylsilyl)-polydimethylsiloxane, into contact with a crosslinking agent, such as a silane of the type $SiX_4$ (for example a silicate) or a compound having the following function—$SiX_3$ with X most often being an alkoxy, acyloxy, amino, amido, enoxy, aminoxy, ketiminoxy or oxime function. These functions are well known as being reactive with silanol functions. The resulting product is most often called "functionalized oil". This reaction may be desired directly during preparation of the composition (functionalization in situ) or optionally as a preliminary step before adding the other components of the composition.
2. Crosslinking by hydrolysis of the functionalized oil generally due to water vapor that diffuses into the material from the surface exposed to the atmosphere, and condensation between the silanol groups formed and other residual reactive functions.

With regard to the compositions packaged in the form of a two-component composition (RTV-2), the first component (or part) comprises the polycondensable polyorganosiloxanes and the second component (or part), which is airtight, contains the catalyst and one or more crosslinking agents. The two components (or parts) are mixed at the time of use and the mixture hardens by crosslinking reactions in the form of a relatively hard elastomer, notably when the composition comprises reinforcing fillers. These compositions packaged in two-component systems are well known and are notably described in the work of Walter Noll "Chemistry and Technology of Silicones" 1968, 2nd edition, pages 395 to 398. These compositions most often comprise the following ingredients:
- a reactive polyorganosiloxane with silanol groups at the end of the chain, for example α,ω-di(hydroxydimethylsilyl)(polydimethylsiloxane), in the chain, or both at the end of the chain and in the chain;
- a crosslinking agent;
- a condensation catalyst; and
- optionally water, often present when a dialkyltin dicarboxylate is used as catalyst, the water serving as activator for said catalyst.

In a preferred embodiment, the curable silicone composition X of the invention is a single-component RTV-1 silicone composition which cures via condensation reaction.

The choice of the functional group of the at least one organosilicon component A can be, for example, silicon-bonded hydroxyl groups, silicon-bonded alkoxy groups, silicon-bonded oxime groups, silicon-bonded amino groups, silicon-bonded amido groups, silicon-bonded aminoxy groups, silicon-bonded acyloxy groups, silicon-bonded ketiminoxy groups and silicon-bonded enoxy groups.

In some embodiments, the at least one organosilicon component A is a polydiorganosiloxane having a hydroxyl group at both ends (i.e., a hydroxyl-endcapped polydiorganosiloxane). Organic groups in the polydiorganosiloxanes of component A are monovalent substituted or unsubstituted hydrocarbon groups. These are, for example, unsubstituted hydrocarbon groups, such as alkyl groups, e.g., methyl groups, ethyl groups, propyl groups, butyl groups, hexyl groups or dodecyl groups; aryl groups, e.g., phenyl groups, and aralkyl groups, e.g., β-phenylethyl groups or β-phenylpropyl groups; as well as substituted hydrocarbon groups, such as chloromethyl groups or 3,3,3-trifluoropropyl groups. In general, methyl groups are used in most cases because of the ease of production of the polymers.

In some embodiments, the hydroxyl-endcapped polydiorganosiloxane preferably has a viscosity of from about 100 to about 100,000 mPa·s at 25° C., preferably from about 1,000 to about 75,000 mPa·s at 25° C., more preferably from about 2,500 to about 50,000 mPa·s at 25° C.

In some embodiments, the at least one organosilicon component A is a blend of hydroxyl-endcapped polydiorganosiloxanes. The blend of hydroxyl-endcapped polydiorganosiloxanes preferably has a viscosity of from about 100 to about 100,000 mPa·s at 25° C., preferably from about 1,000 to about 75,000 mPa·s at 25° C., more preferably from about 2,500 to about 50,000 mPa·s at 25° C.

In some embodiments, the at least one organosilicon component A is a blend of at least three hydroxyl-endcapped polydiorganosiloxanes (A1, A2, and A3). In some embodiments, the hydroxyl-endcapped polydiorganosiloxane A1 has a viscosity between about 100 to about 10,000 mPa·s at 25° C.; the hydroxyl-endcapped polydiorganosiloxane A2 has a viscosity between about 5,000 to about 25,000 mPa·s at 25° C.; and the hydroxyl-endcapped polydiorganosiloxane A3 has a viscosity between about 20,000 to about 100,000 mPa·s at 25° C. In a preferred embodiment, the viscosity of the hydroxyl-endcapped polydiorganosiloxane A1 is between about 500 to about 7,500 mPa·s at 25° C., more preferably between about 1,000 to about 5,000 mPa·s at 25° C. In a preferred embodiment, the viscosity of the hydroxyl-endcapped polydiorganosiloxane A2 is between about 7,500 to about 20,000 mPa·s at 25° C., more preferably between about 10,000 to about 15,000 mPa·s at 25° C. In a preferred embodiment, the viscosity of the hydroxyl-endcapped polydiorganosiloxane A3 is between about 25,000 to about 75,000 mPa·s at 25° C., more preferably between about 40,000 to about 60,000 mPa·s at 25° C.

Suitable condensation catalysts C are tin derivatives such as compounds based on alkyltin, such as dimethyl tin dioleate, dimethyl tin dilaurate, dibutyl tin diacetate, dibutyl tin dioctoate, dibutyl tin dilaurate (DBTDL), dibutyl tin dioleate, diphenyl tin diacetate, dibutyl tin oxide, dibutyl tin dimethoxide, dibutyl-bis(triethoxysiloxy) tin, and dioctyl tin dilaurate.

Alternative condensation catalysts C are known in the prior art, notably titanium-based catalysts (see for example international patent application WO 2013/036546). Other condensation catalysts C have been mentioned, for example catalysts based on zinc, scandium, ytterbium, copper, silver, cerium, molybdenum, bismuth, hafnium or guanidine derivatives. Metal carboxylates such as iron octoate, cobalt octoate, manganese octoate, tin naphthenate, tin caprylate, and tin oleate are also mentioned as suitable condensation catalysts C. The use of chelates of zirconium or of titanium is described in particular in international patent application WO 01/49789. Other alternatives that may be used as a condensation catalyst C are described in patent applications FR 2 856 694 or US2017022325.

The amount of condensation catalyst C included in the curable silicone composition X is preferably from 0.001 to 5 parts by weight based on 100 parts by weight of the base polymer of component A. If the condensation catalyst C is present at less than the defined range, a longer time will be necessary for curing. Additionally, cure of the deep inside of the composition, which is not in contact with air, would be incomplete. On the contrary, if the amount of condensation catalyst C is more than the defined range, the storage stability of the composition would be lower. More preferably, the amount of condensation catalyst C is from 0.005 to 0.5 parts by weight based on 100 parts by weight of the base polymer of component A.

Examples of functional group for the at least one crosslinking agent D are the following:
- Hydrolyzable and condensable groups of the alkoxy type can be used. Examples include groups having from 1 to 8 carbon atoms such as the methoxy, ethoxy, n-propoxy, isopropoxy, n-butoxy, iso-butoxy, sec-butoxy, tert-butoxy, 2-methoxyethoxy, hexyloxy or octyloxy groups.
- Hydrolyzable and condensable groups of alkoxy-alkylene-oxy type can be used. Examples include methoxy-ethylene-oxy group.
- Hydrolyzable and condensable groups of amino type can be used. Examples include methylamino, dimethylamino, diethylamino, n-butylamino, sec-butylamino or cyclohexylamino groups.
- Hydrolyzable and condensable groups of N-methyl-acetamido group.
- Hydrolyzable and condensable groups of the acylamino type can be used. Examples include benzoyl-amino group.
- Hydrolyzable and condensable groups of aminoxy type can be used. Examples include dimethylaminoxy, diethylaminoxy, dioctylaminoxy or diphenylaminoxy groups.
- Hydrolyzable and condensable groups of iminoxy and in particular ketiminoxy type can be used. Examples include groups derived from the following oximes: acetophenone-oxime, acetone-oxime, benzophenone-oxime, methyl-ethyl-ketoxime, diisopropylketoxyme or methylisobutyl-ketoxime.
- Hydrolyzable and condensable groups of the acyloxy type can be used. Examples include acetoxy group.
- Hydrolyzable and condensable groups of the enoxy type can be used. Examples include 2-propenoxy group.

Examples of crosslinking agents D that can be included in the curable silicone compositions X of the invention include, but are not limited to, alkoxy compounds such as ethyl silicate, propyl silicate, methyltrimethoxysilane, vinyltrimethoxysilane, methyltriethoxysilane, vinyltriethoxysilane, methyl-tris(methoxyethoxy)silane, vinyl-tris(methoxyethoxy)silane, and methyltripropenoxysilane; acetoxy compounds such as methyltriacetoxysilane, ethyltriacetoxysilane, and vinyltriacetoxysilane; and methyltris(acetonoxime)silane, vinyltris(acetonoxime)silane, methyltris(methylethylketoxime)silane, vinyltris(methylethylketoxime)silane; as well as partial hydrolyzates of the said compounds. Additionally, there are further mentioned cyclic siloxanes such as hexamethy-bis(diethylaminoxy)cyclotetrasiloxane, tetramethyldi-butyl-bis(diethylaminoxy)cyclotetrasiloxane, pentamethyl-tris(diethylaminoxy)cyclotetrasiloxane, hexamethyl-bis(methylethylaminoxy) cyclotetrasiloxane, and pentamethyl-bis(diethylaminoxy)mono(methylethylaminoxy) cyclotetrasiloxane. The crosslinking agent D may have either a silane structure or a siloxane structure, and the siloxane structure may be a linear, branched or cyclic one. Two or more of the crosslinking agents D above may be used in combination. In some embodiments, a combination of methyltriacetoxysilane and ethyltriacetoxysilane is used as the at least one crosslinking agent D.

The amount of the at least one crosslinking agent D is preferably from 0.1 to 20 parts by weight based on 100 parts by weight of the base polymer(s) of component A. If the amount of the at least one crosslinking agent D is less than 0.1 part by weight, the cured rubber product will not have sufficient strength. On the contrary, if it is more than 20 parts by weight, the final rubber product will be inconveniently brittle.

In some embodiments, the amount of the at least one crosslinking agent D is chosen such that the ratio of acetoxy group to silanol group in the composition is between 15 to 25, preferably between 17.5 to 22.5, more preferably between 20 to 21. In a preferred embodiment, the amount of the at least one crosslinking agent D is chosen such that the ratio of acetoxy group to silanol group in the composition is about 20 or about 21.

The curable silicone composition X can optionally contain at least one adhesion promoter E. The at least one adhesion promoter E can be one or more organic silanes such as, for example, alkoxysilanes, vinylalkoxysilanes, aminoalkoxysilanes, gamma-glycidoxypropyltrimethoxysilane (GLYMO), methacryloxypropyltrimethoxysilane (MEMO), di-t-butoxydiacetoxysilane and mixtures thereof. In another embodiment, the at least one adhesion promoter E can also be one or more organic silanes, such as compounds that have an amino functional group and less than three alkoxy groups attached to silicon. Examples include gamma-aminopropylmethyldiethoxysilane, gamma-aminopropylmethyldimethoxysilane, N-(2-aminoethyl)3-aminopropylmethyldimethoxysilane, N-(2-aminoethyl)-3aminopropylmethyldiethoxy and mixtures thereof.

In some embodiments, the adhesion promoter E is selected from di-t-butoxydiacetoxysilane, gamma-glycidoxypropyltrimethoxysilane (glymo), or a combination thereof.

In some embodiments, the at least one adhesion promoter E is included in an amount of from about 0.1 to about 10% by weight of the total composition, preferably from about 1 to about 7% by weight of the total composition, more preferably from about 3 to about 5% by weight of the total composition.

The electroconductive curable silicone composition X of the present invention may additionally contain, if desired, filler(s), curing retarder(s), plasticizer(s), organic solvent(s), pigment(s), heat-resistance enhancer(s), fireproofing agent(s), and other additives. Furthermore, it may also contain any other polyorganosiloxanes within such a range that would not interfere with the effect of the present invention. Examples of such optional additives include, but are not limited to, a reinforcing filler such as fumed silica, precipitated silica, quartz powder, diatomaceous earth, calcium carbonate and sintered clay, as well as titanium oxide, aluminum oxide, zinc oxide, iron oxide, cerium oxide, mica, clay, graphite, zinc carbonate, manganese carbonate, cerium hydroxide, glass beads, polydimethylsiloxane, and alkenyl group-containing polysiloxanes.

Other examples of optional additives include surfactants, such as silicone polyether, UV tracers (optical brightener), and curing speed modifiers, such as short chain hydroxyl-endcapped polydiorganosiloxanes.

Rheology modifiers can optionally be added to improve rheological properties, to provide higher flow and smooth surfaces of the shaped articles. Such rheology modifiers can be PTFE-powders, boron oxide derivatives, flow additives like fatty acid fatty alcohol derivatives or derivative, esters and its salts or fluoroalkyl surfactants. Examples of rheology modifiers that may be used include, for example, epoxy functional silanes, poly(aryl)siloxane, polyalkylene glycol, polyester polyols, polyhydric alcohols, dicarboxylic acids, polyester diols, and silicone polyethers such as silicone-polyether block copolymer, free polyether, and mixtures thereof, such as, for example BLUESIL SP-3300 (Siloxanes and Silicones, di-Me, 3-hydroxypropyl Me, ethoxylated propoxylated; Elkem Silicones).

Other examples of additives that may be used include, but are not limited to, organic dyes or pigments, stabilizers introduced in silicone rubbers in order to improve heat stability, resistance against hot air, reversion, depolymerisation under attack of traces of acids or water at high temperature. Plasticizers, or release oils, or hydrophobicizing oils, such as polydimethylsiloxane oils, without hydroxyl groups. Mold-release such as fatty acid derivatives or fatty alcohol derivatives, fluoroalkyl.

The invention also relates to a cured silicone rubber obtained by curing a curable silicone composition X as defined herein. In a still further embodiment of the present invention there is provided an article comprising the aforementioned curable silicone composition X.

In some embodiments, the curable silicone composition X according to the invention can be used in the field of industry, electronics and healthcare. For example, a curable silicone composition X can be used to coat the surface of stator bars of hydro-generators. The electrical conductivity of the coating is to reduce or eliminate static that may otherwise build up during the operation of the hydro-generators. Typically, the stator bar has a copper core which is then wrapped with epoxy tape that has mica in it. Thus, in some embodiments, the coating substrate is epoxy with mica.

Use of the cured silicone elastomers of the invention in an article and/or product, such as an electronic sealant or coating described herein is also provided.

The curable silicone composition X may alternatively be processed using a 3D printing method. A typical method of forming a three-dimensional (3D) article comprises the following steps:
i) printing a first curable silicone composition with a 3D printer to form a layer;
ii) optionally heating the layer to form an at least partially cured layer;
iii) printing a second curable silicone composition on the at least partially cured layer with the 3D printer to form a subsequent layer;
iv) optionally heating the subsequent layer to form an at least partially cured subsequent layer; and
v) optionally, repeating steps iii) and iv) with independently selected curable silicone composition(s) for any additional layer(s) to form the 3D article;
wherein the first and second curable silicone compositions are the same as or different from one another, and wherein at least one of the first and second curable silicone compositions is the curable silicone composition X according to the invention and as described above.

Other advantages provided by the present invention will become apparent from the following illustrative examples.

EXAMPLES

Materials and Methods

Preparation of the Silicone Compositions
In the Examples below, the following components were used:
A1: α,ω-silanol polydimethylsiloxanes (average viscosity of 50000 mPa·s)
A2: α,ω-silanol polydimethylsiloxanes (average viscosity of 14000 mPa·s)
A3: α,ω-silanol polydimethylsiloxanes (average viscosity of 3500 mPa·s)
CB1: Vulcan® XC72R furnace carbon black (Cabot)
CB2: AB100%-01 acetylene carbon black (Soltex)
C: dibutyltin dilaurate
D1: methyl triacetoxysilane (MTA)
D2: ethyl triacetoxysilane (ETA)
E1: di-t-butoxydiacetoxysilane
E2: gamma-glycidoxypropyltrimethoxysilane (glymo)
Carbon Black Properties
The properties of the two carbon blacks used in the exemplary compositions (CB1 & CB2) are provided below in Tables 1 & 2. In these tables, the following abbreviations are used:
Tint=Tinting Strength
I2NO=Iodine Absorption Number
OAN=Oil Absorption Number
RES 325=325 Mesh Residue
Vulcan® XC72R (CB1) is a powdered carbon black having a typical bulk density of 6 lbs/ft$^3$ and an average particle size of 50 nm. The BET surface area is 241 m$^2$/g. The specifications of Vulcan® XC72R carbon black from Cabot are provided below in Table 1.

TABLE 1

| Test Code | Units | ASTM Test Reference | Low | High |
|---|---|---|---|---|
| Tint | % | D-3265 | 83 | 91 |
| I2NO | g/kg | D-1510 | 235 | 271 |
| OAN | ml/100 g | D-2414 | 182 | 202 |
| Moisture | % | D-1509 | — | 3 |
| RES-325 | ppm | D-1514 | — | 10 |
| Ash | % | D-1506 | — | 0.2 |

AB100%-01 (CB2) is an acetylene black having an average particle size of 35-40 nm. The BET surface area is 70 m$^2$/g. The specifications of AB100%-01 from Soltex are provided below in Table 2.

TABLE 2

| Test Code | Units | ASTM Test Reference | Low | High |
|---|---|---|---|---|
| Ash | % | D-1506-99 | — | <0.05 |
| I2NO | mg/g | D-1510 | — | 91 |
| OAN | ml/100 g | D-2414-16 | 190 | 230 |
| Moisture | % | D-1509-95 | — | <0.2 |
| RES-325 | ppm | D-1514-01 | — | <500 |

Methods:
1) Process
   Add all silicone polymers and the carbon blacks.
   Mix at 2000 rpm for 1 min→hand mix to scrape off carbon black on the wall and mix it in→mix at 2000 rpm for 1 min→hand mix→mix at 2000 rpm for 2 mins→hand mix→mix at 2000 rpm for 1 min to form a homogeneous paste.
   Let material cool down (heat was generated during shearing at step 2).
   Add dibutyltin dilaurate. Hand mix→mix at 2000 rpm for 1 min→hand mix→mix at 2000 rpm for 30 sec.
   Add silane. Hand mix→mix at 2000 rpm for 1 min→hand mix→mix at 2000 rpm for 30 sec (some heat is generated during this step due to reaction).
2) Curing
2.1) Sample for Electrical Resistance Measurement
   After all components were added according to 1) Process, the sealant sample was spread on a piece of Mylar using a wood tongue depressor by hand. Time zero was when the sealant was spread on Mylar.
2.2) Sample for Mechanical Properties Measurement
   A slab (about 2 mm in thickness, 152 mm in width, and 152 mm in length) was made with a mold. The slab was kept in the mold for 2 days in an enclosure with liquid water in the enclosure to maintain high humidity. After 2 days, the slab was taken out of the mold. Then it was hung in the hood at 25° C. for 5 days for curing.
2.3) Sample for Volume Resistivity Measurement
   A slab (about 2 mm in thickness, 152 mm in width, and 152 mm in length) was made with a mold for each of the formulation variants. The slab was kept in the mold for 2 days in an enclosure with liquid water in the enclosure to maintain high humidity. After 2 days, the slab was taken out of the mold. Then it was hung in the hood at 25° C. for 5 days for curing, before the 0 day testing was conducted. In other words, time zero is after 7 days the sealant was prepared, or 5 days after the slab was hung in the hood for curing.
3) Electrical Resistance Measurement
   A digital multimeter (Etekcity Model No. MSR-R500) is used to collect resistance readings. After changing it to resistance measurement mode, place its two probes (needle shaped) on top of the sealant at an angle of ~30° to the sealant surface. The two probes are ~1 cm apart. Gentle force is applied, when pressing the probes to sealant surface. Three readings are taken at 3 different regions of the sealant surface as one measurement.
4) Mechanical Properties
   The following mechanical properties were evaluated: Durometer Shore A/Shore OO, tensile strength, elongation at break, tear strength, hardness, and modulus according to the method described in standard ASTM D412.
5) Volume Resistivity Measurement
   Volume resistivity was measured using a Loresta® GX equipped with ESP 4-pin probe at room temperature. The sample was about 2 mm thick and 48 mm in diameter, which was cut from a slab. The surface of the slab that was at the bottom of the cavity of the mold was used for this testing.
6) Application Methods
   The electrically conductive silicone composition of the invention can be applied as a potting material, adhesive, coating, etc. via various methods for those types of products.

Example 1—Exemplary Compositions of the Invention

Silicone compositions containing varying amounts of furnace black (CB1) and acetylene black (CB2) as defined below in Table 3 were produced using the process as described above.

TABLE 3

| Examples | Comp. 1 | Ex. 1 | Ex. 2 | Ex. 3 | Ex. 4 | Comp. 2 |
|---|---|---|---|---|---|---|
| A1 | 24.25 | 24.25 | 24.25 | 24.25 | 24.25 | 24.25 |
| A2 | 20.41 | 20.41 | 20.41 | 20.41 | 20.41 | 20.41 |
| A3 | 26.45 | 26.45 | 26.45 | 26.45 | 26.45 | 26.45 |
| CB1 | 14.81 | 13.63 | 12.44 | 7.405 | 4.89 | 0 |
| CB2 | 0 | 1.18 | 2.37 | 7.405 | 9.92 | 14.81 |
| C | 0.02 | 0.02 | 0.02 | 0.02 | 0.02 | 0.02 |
| D1 | 7.80 | 7.80 | 7.80 | 7.80 | 7.80 | 7.80 |
| D2 | 2.20 | 2.20 | 2.20 | 2.20 | 2.20 | 2.20 |
| E1 | 3.42 | 3.42 | 3.42 | 3.42 | 3.42 | 3.42 |
| E2 | 0.64 | 0.64 | 0.64 | 0.64 | 0.64 | 0.64 |

Example 2—Resistivity Over Time

The electrical resistance (R) of the silicone compositions described above in Example 1 were measured at various times post-curing at ambient temperature and humidity. Data are provided below in Table 4.

TABLE 4

| Aging Hours | 19 | 91 | 163 | 259 |
|---|---|---|---|---|
| Comp. 1 (100% CB1/0% CB2) | 306 ohm | 360 ohm | 420 ohm | 456 ohm |
| Ex. 1 (92% CB1/8% CB2) | 232 ohm | 288 ohm | 272 ohm | 306 ohm |
| Ex. 2 (84% CB1/16% CB2) | 252 ohm | 278 ohm | 286 ohm | 270 ohm |
| Ex. 3 (50% CB1/50% CB2) | 418 ohm | 310 ohm | 368 ohm | 276 ohm |
| Ex. 4 (33% CB1/67% CB2) | 200 ohm | 214 ohm | 300 ohm | 247 ohm |
| Comp. 2 (0% CB1/100% CB2) | 212 ohm | 198 ohm | 252 ohm | 292 ohm |

As shown in Table 4, silicone compositions comprising 100% furnace black (Comp. 1) displays a steady increase of electrical resistance (R) over time, and is more than 450 ohm after 250 hrs. For other samples, which have different percentages of acetylene black mixed in, R fluctuates and does not increase significantly. After 250 hrs of aging, all samples containing acetylene black have R in the range of 250-320 ohm. This stabilizing effect is observed even in silicone compositions comprising only 8% of acetylene black. This data supports that a lower long-term electrical resistance can be obtained for samples that uses two carbon blacks, which is very advantageous for many applications.

Example 3—Mechanical Properties of the Exemplary Compositions of the Invention

Mechanical properties of exemplary compositions of the invention containing 84% furnace black/16% acetylene black were measured as described above. The data are presented below in Table 5.

TABLE 5

| Property | Result |
|---|---|
| Tensile strength | 260 psi |
| Elongation | 250% |
| Tear strength | 50 psi |
| Peel strength (1 inch wide) | 30 lbf |

TABLE 5-continued

| Property | Result |
|---|---|
| Resistivity (approx.) | 1.7 kΩ |
| Durometer, Shore A | 38 |

Example 4—Volume Resistivity Over Time

The volume resistivity of the silicone compositions described above in Example 1 were measured at various times post-curing at ambient temperature and humidity. Data are provided below in Table 6.

TABLE 6

| Aging days | 0 | 2 | 7 | 9 | 14 | % increase |
|---|---|---|---|---|---|---|
| Comp. 1 (100% CB1/0% CB2) | 8.8 ohm/cm | 9.2 ohm/cm | 12 ohm/cm | 11.6 ohm/cm | 12.1 ohm/cm | 37.2% |
| Ex. 1 (92% CB1/8% CB2) | 8.3 ohm/cm | 8.4 ohm/cm | 9.3 ohm/cm | 9.2 ohm/cm | 9.8 ohm/cm | 18.4% |
| Ex. 2 (84% CB1/16% CB2) | 8.4 ohm/cm | 8.6 ohm/cm | 8.6 ohm/cm | 9.5 ohm/cm | 10 ohm/cm | 18.8% |
| Ex. 3 (50% CB1/50% CB2) | 8.9 ohm/cm | 9.1 ohm/cm | 10.2 ohm/cm | 10.4 ohm/cm | 10.4 ohm/cm | 16.9% |
| Ex. 4 (33% CB1/67% CB2) | 8.5 ohm/cm | 8.6 ohm/cm | 9.2 ohm/cm | 9.8 ohm/cm | 9.5 ohm/cm | 12.0% |
| Comp. 2 (0% CB1/100% CB2) | 8.5 ohm/cm | 8.4 ohm/cm | 10.3 ohm/cm | 9.5 ohm/cm | 10.6 ohm/cm | 24.1% |

Similar to the electrical resistance data shown above in Table 4, silicone compositions comprising 100% furnace black (Comp. 1) display increased volume resistivity over time, increasing by 37.2% on day 14 vs. day 0. For the other samples, which have different percentages of acetylene black mixed in, the % increase in volume resistivity is below 20%. This stabilizing effect is observed even in silicone compositions comprising only 8% of acetylene black. This data further supports that a lower long-term electrical resistivity can be obtained for samples that uses two carbon blacks, which is very advantageous for many applications.

All references cited in this specification are herein incorporated by reference as though each reference was specifically and individually indicated to be incorporated by reference. The citation of any reference is for its disclosure prior to the filing date and should not be construed as an admission that the present disclosure is not entitled to antedate such reference by virtue of prior invention.

It will be understood that each of the elements described above, or two or more together may also find a useful application in other types of methods differing from the type described above. Without further analysis, the foregoing will so fully reveal the gist of the present disclosure that others can, by applying current knowledge, readily adapt it for various applications without omitting features that, from the standpoint of prior art, fairly constitute essential characteristics of the generic or specific aspects of this disclosure set forth in the appended claims. The foregoing embodiments are presented by way of example only; the scope of the present disclosure is to be limited only by the following claims.

We claim:
1. A curable silicone composition X consisting of:
(A) a silicone base comprising at least one organosilicon component A which cures via condensation-curing reaction;
(B) a combination of at least two types of carbon black CB, in which at least one carbon black is a furnace black CB1 and at least one carbon black is an acetylene black CB2; and
(C) a condensation catalyst C;
(D) at least one crosslinking agent D; and
(E) optionally, an adhesion promoter E.

2. The curable silicone composition X according to claim 1, wherein the at least one organosilicon component A is a hydroxyl-endcapped polydiorganosiloxane.

3. The curable silicone composition X according to claim 1, wherein the at least one organosilicon component A is a blend of hydroxyl-endcapped polydiorganosiloxanes.

4. The curable silicone composition X according to claim 1, wherein the furnace black CB1 has a BET surface area of from 80 to 300 m$^2$/g, an oil absorption number of from 70 to 250 ml/100 g, and an iodine absorption number of from 100 to 350 mg/g.

5. The curable silicone composition X according to claim 1, wherein the acetylene black CB2 has a BET surface area of from 50 to 200 m$^2$/g, an oil absorption number of from 70 to 250 ml/100 g, and an iodine absorption number of from 70 to 150 mg/g.

6. The curable silicone composition X according to claim 1, wherein the total amount of carbon black CB in the curable silicone composition X is from 5% to 50% by weight based on the total composition.

7. The curable silicone composition X according to claim 6, wherein the total amount of carbon black CB in the curable silicone composition X is from 10% to 25% by weight based on the total composition.

8. The curable silicone composition X according to claim 1, wherein the weight ratio of the furnace black CB1 to the acetylene black CB2 is from 92:8 to 8:92.

9. The curable silicone composition X according to claim 1, wherein the weight ratio of the furnace black CB1 to the acetylene black CB2 is from 92:8 to 50:50.

10. The curable silicone composition X according to claim 1, wherein the condensation catalyst C is a tin derivative selected from the group consisting of dimethyl tin dioleate, dimethyl tin dilaurate, dibutyl tin diacetate, dibutyl tin dioctoate, dibutyl tin dilaurate (DBTDL), dibutyl tin dioleate, diphenyl tin diacetate, dibutyl tin oxide, dibutyl tin dimethoxide, dibutyl-bis(triethoxysiloxy) tin, and dioctyl tin dilaurate.

11. The curable silicone composition X according to claim 1, wherein the at least one crosslinking agent D is one or more compound selected from methyltriacetoxysilane, ethyltriacetoxysilane, vinyltriacetoxysilane, methyltris(acetonoxime)silane, vinyltris(acetonoxime)silane, methyltris(methylethylketoxime)silane, vinyltris(methylethylketoxime)silane; and partial hydrolyzates of the said compounds.

12. The curable silicone composition X according to claim 1, wherein the at least one crosslinking agent D is methyltriacetoxysilane, ethyltriacetoxysilane, or a combination thereof.

13. The curable silicone composition X according to claim 1, wherein the adhesion promoter E is selected from di-t-butoxydiacetoxysilane, gamma-glycidoxypropyltrimethoxysilane (glymo), or a combination thereof.

14. The curable silicone composition X according to claim 1, wherein the curable silicone composition X is a single-component RTV-1 silicone composition.

15. A cured silicone rubber obtained by curing a curable silicone composition X according to claim 1.

16. An article comprising the curable silicone composition X according to claim 1.

17. The article of claim 16, wherein the article is a stator bar of hydro-generator, wherein the stator bar has a copper core which is wrapped with epoxy tape that has mica in it, and the curable silicone composition X is coated on the surface of said stator bar.

18. An electrically conductive silicone sealant comprising the curable silicone composition X according to claim 1.

19. The electrically conductive silicon sealant according to claim 18, wherein the electrically conductive silicone sealant is used to coat a surface of stator bars of hydro-generators.

20. A method of forming a three-dimensional (3D) silicone elastomer article comprising generating a molded body from a curable silicone composition X according to claim 1 by means of a 3D printer, preferably an extrusion or an inkjet 3D printer, and curing the curable silicone composition X to form an elastomer article.

21. A method of forming a three-dimensional (3D) article, said method comprising:
   i) printing a first curable silicone composition with a 3D printer to form a layer;
   ii) printing a second curable silicone composition on the at least partially cured layer with the 3D printer to form a subsequent layer; and
   iii) optionally, repeating steps i) and i) with independently selected curable silicone composition(s) for any additional layer(s) to form the 3D article;
   wherein the first and second curable silicone compositions are the same as or different from one another, and wherein at least one of the first and second curable silicone compositions is the curable silicone composition X as claimed in claim 1.

22. A curable silicone composition X, comprising
   (A) a silicone base comprising at least one organosilicon component A which cures via condensation-curing reaction, wherein the at least one organosilicon component A is a blend of at least three polydiorganosiloxanes having a hydroxyl group at both ends, wherein the hydroxyl-endcapped polydiorganosiloxane A1 has a viscosity between about 100 to about 10,000 mPa·s at 25° C.; the hydroxyl-endcapped polydiorganosiloxane A2 has a viscosity between about 5,000 to about 25,000 mPa·s at 25° C.; and the hydroxyl-endcapped polydiorganosiloxane A3 has a viscosity between about 20,000 to about 100,000 mPa·s at 25° C.,
   (B) a combination of at least two types of carbon black CB, in which at least one carbon black is a furnace black CB1 and at least one carbon black is an acetylene black CB2; and
   (C) a condensation catalyst C;
   (D) at least one crosslinking agent D; and
   (E) optionally, an adhesion promoter E.

* * * * *